UNITED STATES PATENT OFFICE.

FERDINAND MORITZ MEYER, OF SAARBRUCKEN, GERMANY, ASSIGNOR, BY MESNE ASSIGNMENTS, TO THE CHEMICAL FOUNDATION, INC., A CORPORATION OF DELAWARE.

HYDRAULIC INGREDIENT AND PROCESS OF MAKING SAME.

1,343,929.   Specification of Letters Patent.   Patented June 22, 1920.

No Drawing. Application filed January 3, 1914, Serial No. 810,198. Renewed October 22, 1919. Serial No. 332,440½.

*To all whom it may concern:*

Be it known that I, FERDINAND MORITZ MEYER, a subject of the Emperor of Germany, and a resident of Saarbrucken, Germany, have invented certain new and useful Improvements in Hydraulic Ingredient and Processes of Making Same, of which the following is a specification.

The object of the present invention is the production of a material, which is capable of giving hydraulic setting powers to hydraulic lime, or ordinary lime, or lime mortar. The present invention does not relate to the production of a material which is properly called a hydraulic cement, since the calcined, or calcined and crushed material itself (without the addition of lime or hydraulic lime) when mixed with water, does not harden, as does hydraulic cement.

My improved process is based upon the manufacture and use of predetermined compounds from lime and clay which while possessing no considerable setting power, when used alone, have the power of materially increasing the binding and setting power of mixtures of lime (or its equivalent) with sand, which mixtures, by themselves are only slightly hydraulic.

The first part of my improved process produces a product which by itself has no binding power at all or at most has only a very slight binding power, but which has the property of imparting a considerable degree of hydraulicity to mortars containing lime, clay or silicious lime. The mortars made by adding the new ingredient to mortar, have a very excellent strength which considerably exceeds that of cements made according to known processes. Thus, the primary object of this invention is to manufacture not a cement, but a hydraulic ingredient which itself does not possess the properties of a cement.

In my improved process there are particularly two points which occasion these important new properties of the product to be made:—firstly, the percentage of lime is considerably lower than that employed in the ordinary processes of making hydraulic cement. Secondly, the temperature is kept lower than in the ordinary processes in making cement, at any rate, so low that sintering shall not take place.

One form of the process for making such a body capable of increasing the hydraulic properties of lime or hydraulic lime, which is essential in the present process for increasing the hydraulicity and the strength of lime is as follows:—

When clay is mixed with lime-stone, chalk, dolomite, magnesite, soft lime, such as is known in Germany as "meadow lime" (Wiesenkalk), or marl in such a manner that a mixture is produced which titrates between 25–50% calcium carbonate, and a corresponding quanity of a flux, say 5% calcium chlorid is added, the mixture being heated to 800° C., an unsintered mixture is obtained which, when ground and treated with water, hardens only very slightly. If this ground product is mixed with burnt lime or hydraulic lime (as in the production of mortar), products are then obtained which become exceedingly hard both in the air and in water.

The lightly calcined product with three parts by weight of sand, taken according to the standards for Portland cement, is mixed, for example, with 3 parts by weight of burnt lime or hydraulic lime. The following strengths are then found (measured by the German standards for testing Portland cement and hardening after 28 days). In the table, A designates the new product alone, B burnt lime, C hydraulic lime, D a mixture of 25 parts of A and 75 parts of burnt lime (fat lime), E a mixture of 25 parts of the new product and 75 parts of hydraulic lime.

*Table.*

|   | Air-hardening. | | Combined hardening. | | Water-hardening. | |
|---|---|---|---|---|---|---|
|   | Tension. | Compression. | Tension. | Compression. | Tension. | Compression. |
| A | 8 | 40 | 11 | 40 | 4 | 16 |
| B | 7 | 24 | 0 | 35 | 0 | 25 |
| C | 9 | 40 | 11 | 40 | 5 | 16 |
| D | 16 | 109 | 16 | 113 | 14 | 91 |
| E | 37 | 201 | 30 | 243 | 25 | 201 |

This table shows the exceedingly great and quite surprising hardening action of the new product.

It is well known that Portland cement, granulated blast-furnace slag and also trass exercise on lime a relatively small hardening action; none of these bodies, however, acts even approximately in the same manner as does the herein described new product which is quite different from those mentioned above both in its composition and in its mode of production.

It is also well known that good hydraulic limes can be made by carefully burning clayey limestones. These harden, however, by themselves, whereas in contradistinction thereto the new product develops its energy only in combination with large quantities of lime. It is also well known that a mixture of clay, feldspar, lime and calcium chlorid may be calcined for the purpose of liberating the alkali of the feldspar.

The sintering of clay and lime with the aid of chlorid of calcium is a well known chemical reaction frequently employed for quantitatively determining alkalis in feldspar and clays.

The new product can be made wherever there are suitable raw materials. By means of the present invention, a product having a strength approximately equal to that of Portland cement or of the best mortar can be produced, and this without large expenditure of fuel or the necessity of extensive apparatus.

Additional investigations have shown that fluorspar and cryolite act in a manner similar to the calcium chlorid mentioned above.

If a mixture of aluminum hydroxid and calcium carbonate in the proportions theoretically necessary to form calcium aluminate is burnt in the counter-current furnace at 800° C. (under the same conditions as stated in the above example of the manufacture of the hydraulic ingredient) no chemical compound having the properties of $Al_2O_3.CaO$ is obtained; the CaO and $Al_2O_3$ remain substantially uncombined. It follows that aluminate fluxes do not play any material part in the herein described process.

I claim:—

1. A process for making a hardening material for lime mortar consisting in burning a mixture containing clay and about twenty-five to fifty per cent. of calcium carbonate and a small proportion of a fluxing agent at a temperature below the clinkering point, but high enough to drive off most of the $CO_2$ of the carbonate, to produce a product which reacts slowly with water.

2. In the process of making mortar having high setting power, the steps of burning a mixture containing clay and about twenty-five to fifty per cent. of calcium carbonate and a small proportion of a flux at a temperature below the clinkering temperature of said mixture, but high enough to burn the $CaCO_3$ to CaO, to produce a product which reacts slowly with water, and thereafter mixing the product thereby obtained with lime and sand in the proportion of about one part of said product to materially greater amounts of both lime and sand.

3. A process of making an agent capable of increasing the hydraulic properties of mortar, which comprises burning a mixture containing clay and calcareous material, which mixture contains a percentage of calcareous material which is equivalent to not over 50%, calculated as $CaCO_3$, together with a relatively small amount of a salt of which the sintering temperature is below that of the mixture, said burning being conducted at a temperature below the temperature necessary for sintering or clinkering the entire mass.

4. A process of making an agent capable of increasing the hydraulic properties of mortar, which comprises burning a mixture containing clay and calcareous material, which mixture contains a percentage of calcareous material which is equivalent to not over 50% calculated as $CaCO_3$, together with a relatively small amount of calcium chlorid, said burning being conducted at a temperature below the temperature necessary for sintering the entire mass.

5. As a new product, a calcined but not clinkered mixture of clay-containing materials, between about 15.7% and about 35.9% of CaO, and a smaller amount of a salt capable of sintering at a temperature below the sintering temperature of the entire mixture, said product being, when alone, without any considerable hardening properties, but capable of greatly increasing the hardening properties of hydraulic or non-hydraulic limes, or mortars, including such limes, and said product being capable of reacting slowly with water.

6. As a new product, a calcined but not clinkered mixture of clay-containing materials, and between about 15.7% and about 35.9% of CaO, and a smaller amount of calcium chlorid, said product being, when alone, without any considerable hardening properties, but capable of greatly increasing the hardening properties of hydraulic or non-hydraulic limes, or mortars, including such limes, and said product being capable of reacting slowly with water.

In testimony whereof, I affix my signature in the presence of two witnesses.

FERDINAND MORITZ MEYER.

Witnesses:
MARIA MEUKE,
MORITZ WETZEL.